United States Patent
Hjelm et al.

(10) Patent No.: US 8,655,581 B2
(45) Date of Patent: Feb. 18, 2014

(54) DATA SERVER, USER TERMINAL, ROUTE INFORMATION PROVIDING SYSTEM AND CONTROL METHOD THEREOF

(75) Inventors: Johan Hjelm, Tokyo (JP); Urban Nyblom, Löddeköpinge (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 124 days.

(21) Appl. No.: 13/061,886

(22) PCT Filed: Jan. 8, 2009

(86) PCT No.: PCT/JP2009/050499
§ 371 (c)(1),
(2), (4) Date: Mar. 2, 2011

(87) PCT Pub. No.: WO2010/026783
PCT Pub. Date: Mar. 11, 2010

(65) Prior Publication Data
US 2011/0166780 A1 Jul. 7, 2011

Related U.S. Application Data

(60) Provisional application No. 61/094,105, filed on Sep. 4, 2008.

(51) Int. Cl.
*G01C 21/00* (2006.01)
(52) U.S. Cl.
USPC .......................................................... 701/410
(58) Field of Classification Search
USPC .......................................... 701/201; 455/456
See application file for complete search history.

(56) References Cited

U.S. PATENT DOCUMENTS

| | | | | |
|---|---|---|---|---|
| 8,000,726 B2 * | 8/2011 | Altman et al. | ............. | 455/456.3 |
| 8,045,998 B2 * | 10/2011 | Shaffer et al. | ............. | 455/456.2 |
| 8,073,461 B2 * | 12/2011 | Altman et al. | ............. | 455/456.1 |
| 8,090,534 B2 * | 1/2012 | Sheha et al. | ................. | 701/410 |
| 8,099,109 B2 * | 1/2012 | Altman et al. | ............. | 455/456.3 |
| 8,107,608 B2 * | 1/2012 | Sheha et al. | ............. | 379/207.12 |
| 2004/0054428 A1 | 3/2004 | Sheha et al. | | |
| 2006/0277079 A1 | 12/2006 | Gilligan et al. | | |

FOREIGN PATENT DOCUMENTS

WO 2004/008799 A1 1/2004

* cited by examiner

Primary Examiner — Thomas Tarcza
Assistant Examiner — Alex C Dunn
(74) Attorney, Agent, or Firm — Coats and Bennett, P.L.L.C.

(57) ABSTRACT

According to the first aspect of the present invention, there is a data server (110) providing modified route information to a first user terminal (130) used by a first user, comprising a receiving unit (114) configured to receive a request from the first user terminal for requesting a second user terminal (120) used by a second user to modify route information, a geographical database (113) configured to store geographical data, a route information generation unit (112) configured to generate the route information indicating a route from a first location to a second location, using the geographical data, and a transmitting unit (115), configured to transmit a route modification request with the generated route information to the second user terminal. The receiving unit is further configured to receive modified route information from the second user terminal (120). The transmitting unit is further configured to transmit the modified route information to the first user terminal (130).

18 Claims, 9 Drawing Sheets

Presence Server: Example of presence database (only a part of related data is shown)

| User ID | Destination | Terminal type | User Status |
|---|---|---|---|
| 1243 | 192.168.234.23 | TV | offline |
| 1243 | 192.168.14.2 | PC | invisible |
| 1243 | 192.168.2.22 | mobile | roaming |
| 1246 | 192.168.234.5 | TV | busy |
| 1246 | 192.168.123.2 | mobile | online |
| 1248 | 192.168.122.67 | mobile | online |
| 1249 | 192.168.13.34 | TV | offline |
| 1259 | 192.168.14.3 | PC | online |

FIG. 4

Preference Server: Example of preference database (only a part of related data is shown) 400

| User ID (401) | TV program Priority (402) | Terminal Type (403) | Route Data Type (404) | Type of View (405) |
|---|---|---|---|---|
| 1243 | 1 | TV | Still Image | Overlay |
| 1243 | 2 | PC | Motion Image | Hold |
| 1243 | 3 | TV | Motion Image | Hold |
| 1243 | 5 | TV | Still Image | Overlay |
| 1244 | 1 | TV | Still Image | Hold |
| 1244 | 3 | PC | Still Image | Overlay |

FIG. 5A

Original IPTV stream

FIG. 5B

Overlaid display of the geographical data

FIG. 5C

Hold and display of the geographical data

DATA SERVER, USER TERMINAL, ROUTE INFORMATION PROVIDING SYSTEM AND CONTROL METHOD THEREOF

TECHNICAL FIELD

The present invention generally relates to a navigation system and method to receive an assigned another users' feedback on the navigation terminal. The present invention particularly relates, but is not limited to, a system including a client mobile terminal for interaction with an IPTV system and a navigation system.

BACKGROUND ART

With advancements of mobile technology and positioning systems, user navigation using mobile devices has become a common practice. Currently, there are many mobile devices such as mobile phones, car navigation systems and the like, which have the ability to obtain the current geographical location using location evaluation technologies such as Global Positioning System (GPS) and signal strength based positioning systems.

Even though present navigation systems allow a mobile user to automatically obtain his/her (hereinafter male terms represents both genders) current position using technologies such as GPS, in general, navigation systems cannot automatically obtain users' destination, which is necessary for providing navigation service. In most of the conventional cases the mobile user set the destination by himself at an initial stage of the navigation process.

However, there are cases where the user does not know the exact geographical location of the destination or/and the route (the path from current location to the destination location including both current location and destination location). Moreover, the route provided by the system might not be an optimal solution which satisfies mobile users' need.

As an example, consider a case where a user is going to a friends' birthday party organized at his friends' house. A conventional navigation system may be providing the shortest route to his friends' house. However, in case user wanted to buy a present on the way to the friends' house, the user might want to choose a route that passes through a gift shop on the way to the destination (friends' house). Such a situation can be considered as a case where the conventional navigation systems are unable to provide a suitable route.

When above mentioned situations are considered, one of the most realistic solutions available for the mobile user is asking the route from a person (an assigned user) who already knows the destination or the route.

Even though there are known art that discuss location data information sharing among paired navigation terminals (see Japanese Patent Application Laid Open: 2002-22482), in general, conventional navigation systems do not provide a mechanism that allow direct modification of the route displayed on a mobile terminal by an assigned another user. Thus, users has to depend on another communication channel, which is separated from the navigation system, such as a telephone call, to communicate with the designated user by voice and modify his route by himself according to the designated users' instructions. However, this is not an effective or convenient method for a mobile user or a designated user.

SUMMARY

The present invention is intended to address the above-described problem, and it is a feature thereof to introduce a new technology that enables a navigation system where a user to be provided with a direct route information modification by an assigned another terminal user.

According to the first aspect of the present invention, there is a provided data server providing modified route information to a first user terminal used by a first user, comprising a receiving unit configured to receive a request from the first user terminal for requesting a second user terminal used by a second user to modify route information; a geographical database configured to store geographical data, a route information generation unit configured to generate the route information indicating a route from a first location to a second location, using the geographical data, and a transmitting unit, configured to transmit a route modification request with the generated route information to the second user terminal, wherein the receiving unit further configured to receive, modified route information from the second user terminal, the transmitting unit further configured to transmit the modified route information to the first user terminal.

According to the second aspect of the present invention, there is a provided user terminal which communicates with a data server and receives a request for modifying route information for a user of a first user terminal, comprising a receiving unit configured to receive the request including the route information from the data server, a display unit configured to display the route information, a user operation unit configured to accept user operations for modifying the route information, and a transmitting unit configured transmit the modified route information to the data server, wherein the modified route information indicating a route from a first location to a second location.

Further features of the present invention will become apparent from the following description of an exemplary embodiment with reference to the attached drawings, in which like reference characters designate the same or similar parts throughout the figures thereof.

DETAILED DESCRIPTION

Networked terminals such as PC terminals, networked televisions and networked displays are ubiquitously available in our current living environment; and IPTV systems are gaining popularity among users as a fundamental method for receiving contents in such an environment.

In case the assigned user happened to be in front of a networked terminal with IPTV capability (hereinafter: IPTV terminal) such as a television connected to a set top box with IPTV capability or a PC with IPTV supported hardware and software installed, providing a mechanism to help the mobile user by directly modifying the route being provided to the mobile users' terminal, using the IPTV terminal in hand, could enhance the mobile user experience dramatically and also could make providing instruction to the mobile user much easier for the IPTV terminal user (designated user). Especially, when IP Multimedia Subsystem (IMS) architecture is considered, there is a demand for a technology that allows such a mechanism.

Embodiments of the present invention that focus on the above mentioned user-need will now be described with reference to the attached drawings. The embodiment described below will be helpful in understanding a variety of concepts from the generic to the more specific.

It should be noted that the technical scope of the present invention is defined by claims, and is not limited by the embodiment described below. In addition, not all combinations of the features described in the embodiments are necessarily required for realizing the present invention.

The following embodiment is described in the context of IP Multimedia Subsystem (IMS), but the present invention is not limited thereto. It is possible to replace IMS infrastructure with web services infrastructure and achieve the same basic set of functionalities such as authentication, authorization, message routing, automated service lookup etc. It should be noted that if the present invention is applied for IMS, it is possible to provide modified route information to a mobile user by an assigned another user utilizing an IPTV terminal, which is advantageous over the conventional art.

Figure 1A:
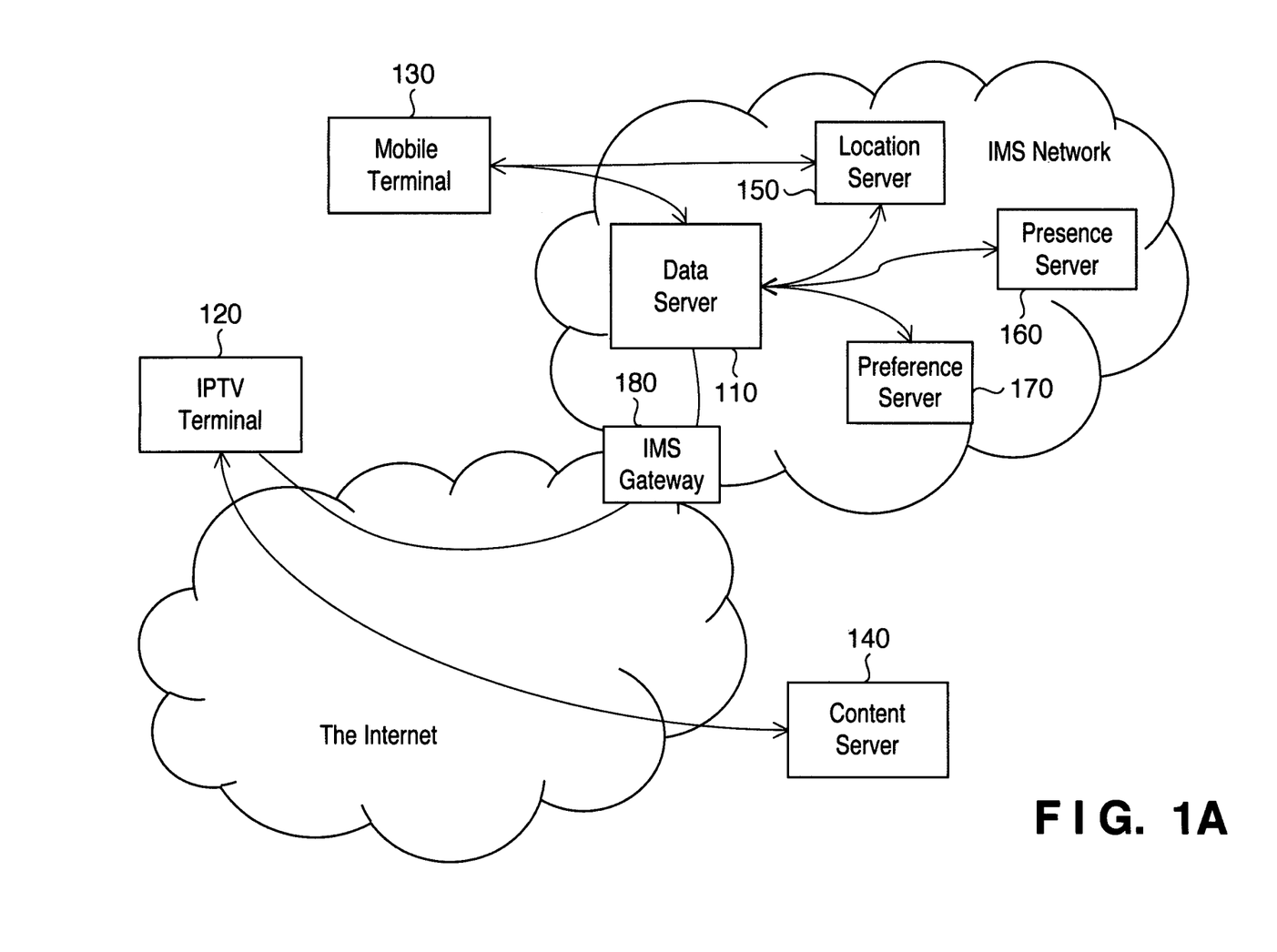
FIG. 1A shows exemplary system architecture according to an embodiment of the present invention.

FIG. 1A shows a high-level system diagram according to an exemplary embodiment of the present invention. The main system elements are a Data Server 110, an IPTV Terminal 120, a Mobile Terminal 130, a Content Server 140, a Location Server 150, a Presence Server 160, a Preference Server 170, and an IMS Gateway 180. The Data Server 110 communicates with the IPTV Terminal 120 via the IMS Gateway 180, the Mobile Terminal 130, the Location Server 150, the Presence Server 160, and the Preference Server 170. The IPTV Terminal 120 communicates with the Data Server 110 via the IMS Gateway 180 and the Content Server 140. The Mobile Terminal 130 communicates with the Data Server 110 and the Location Server 150. The Location Server 150 communicates with the Data Server 110 and the Mobile Terminal 130. The Presence Server 160 communicates with the Data Server 110; the Preference Server 170 communicates with the Data Server 110; and the Content Server 140 communicates with the IPTV Terminal 120.

The communication link may be a wireless connection such as the link between the Data Server 110 and the Mobile Terminal 130, or may be a wired communication link such as the link between the IPTV Terminal 120 and the Content Server 140.

The wireless link may accord to a radio communication protocol such as ANSI-136, GSM (Global Standard for Mobile) communication, GPRS (General Packet Radio Service), EDGE (Enhanced Data Rates for GSM Evolution), Code Division Multiple Access (CDMA), Wideband Code Division Multiple. Access (WCDMA), CDMA2000, Long Term Evolution (LTE) and UMTS (Universal Mobile Telecommunications System). The wired link may accord to Ethernet, FDDI(Fiber distributed data interface), Gigabit Ethernet, and etc.

The system element shown in FIG. 1A is considered to be directly IMS enable or able to access IMS services through a IMS Gateway 180 such as a HIGA (Home IMS Gateway) as disclosed in International Publication No. WO 2006/045706. In the present invention, the initial signaling such as service registration and authentication is conducted according to IMS standards.

Figure 1B:
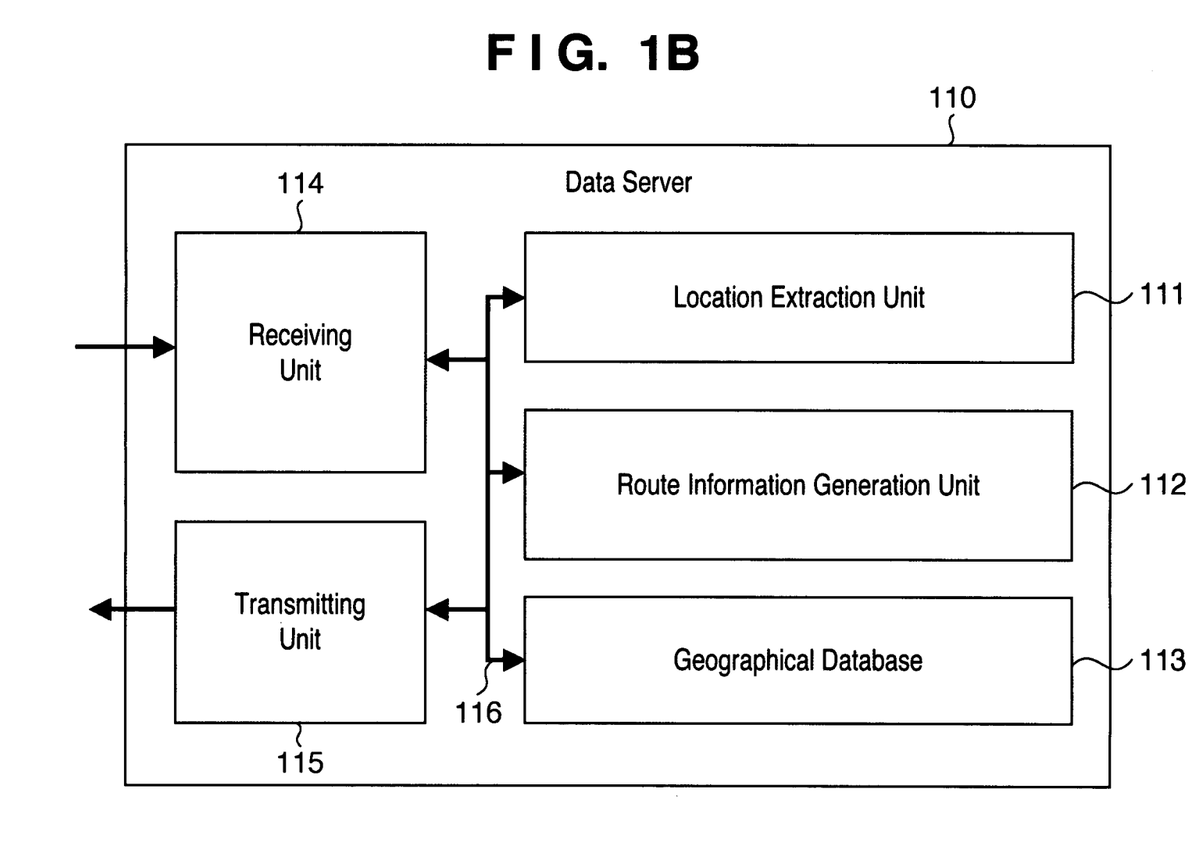
FIG. 1B shows an exemplary functional block diagram of the Data Server.

As shown in FIG. 1B the Data Server 110 includes a Location Extraction Unit 111, a Route Information Generation Unit 112, a Geographical Database 113, a Receiving Unit 114, and a Transmitting Unit 115 as the main functional units. The Receiving Unit 114 receives information from each system element and Transmitting Unit 115 transmits information to each system elements, according to the requests by the Location Extraction Unit 111, the Route Information Generation Unit 112, and the Geographical Database 113. The functional units are logically interconnected with each other, using a Data Bus 116 as shown in FIG. 1B. In an IMS system, the Data Server 110 is implemented with an IMS Application Server as described in IMS specification (http://www.3gpp.org/ftp/Specs/archive/23_series/23.228/23228-860.zip).

The Location Extraction Unit 111 as shown in FIG. 1B, extracts the current location of the Mobile Terminal 130 using a message received from the Mobile Terminal 130 or requesting the current location of the Mobile Terminal 130 from the Location Server 150, which knows the current location of the Mobile Terminal 130.

The Geographical Database 113 as shown in FIG. 1B, contains two types of geographical information; still image type geographical information that used for two-dimensional map view and motion image type geographical information that used for three-dimensional walk-through view. The detail level of each geographical information type contained in the Geographical Database 113 can be selected. The data structure used in the Geographical Database 113 supports such selection.

The Route Information Generation Unit 112 as shown in FIG. 1B, generates route information that includes a route from a current location to a destination, geographical details of surrounding area and user view preference information that describes presentation method. Here, the created route information type may be the still image type or the motion image type according to users' preference. Moreover, the route is represented as a set of location coordinates according to some coordinate system such as WGS 84 including, the current location, the destination location and the points which represent the route between the current location and the destination location. As an example, in case a user wishing to use a navigation service is using a mobile phone, the user might prefer to receive the route information as a two-dimensional map view; on the other hand, when the user is in front of an IPTV terminal 120, the user might prefer to receive the route information as a three dimensional walkthrough view. Here, the Data Server 110 receives preference of the user from the Preference Server 170 and the route information created by Route Information Generation Unit 112 according to these users' preference.

Figure 1C:
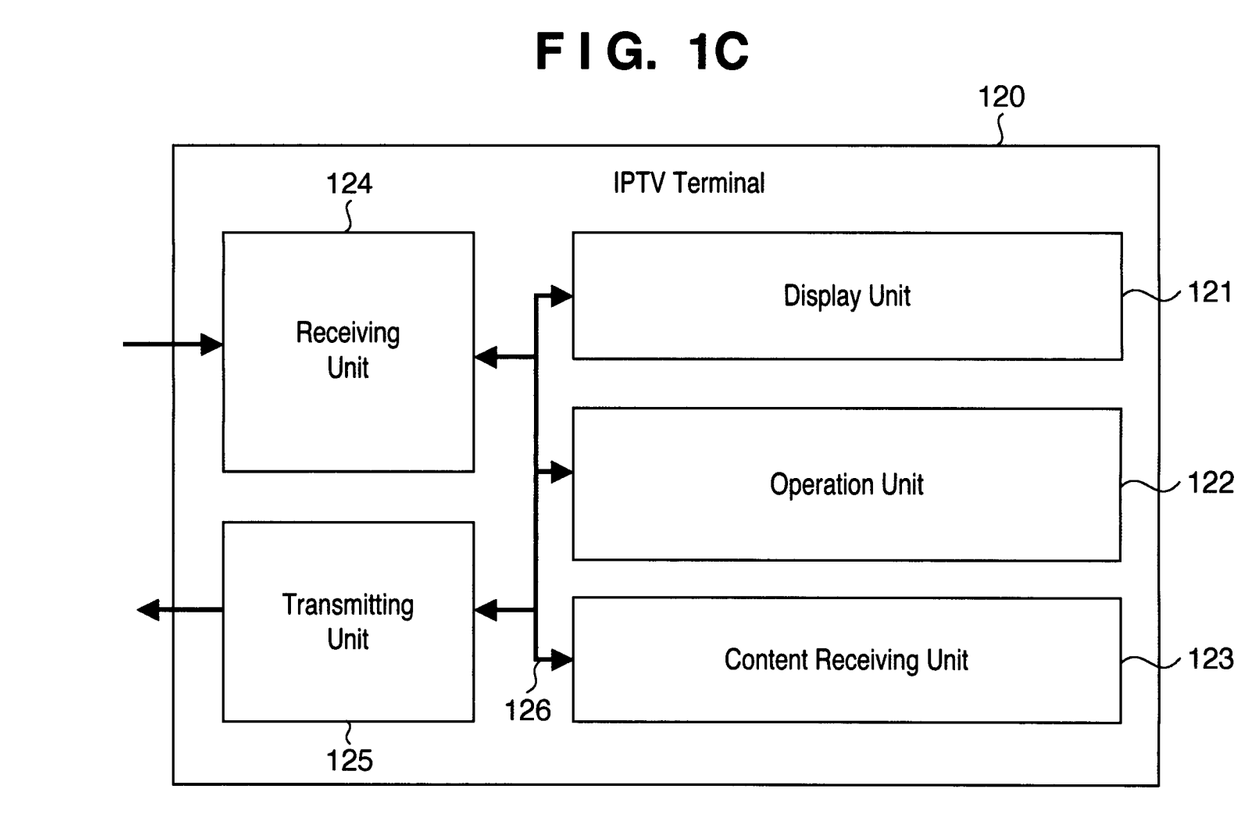
FIG. 1C shows an exemplary functional block diagram of the IPTV Terminal.

As shown in FIG. 1C the IPTV Terminal 120 includes a Display Unit 121, an Operation Unit 122, a Content Receiving Unit 123, a Receiving Unit 124, and a Transmitting Unit 125 as the main functional units. The Receiving Unit 124 receives information from each system element and the Transmitting Unit 125 transmits information to each system element, according to the requests of the Display Unit 121, the Operation Unit 122, and the Content Receiving Unit 123. The functional units are logically interconnected with each other, using a Data Bus 126 as shown in FIG. 1C.

Figure 5A:
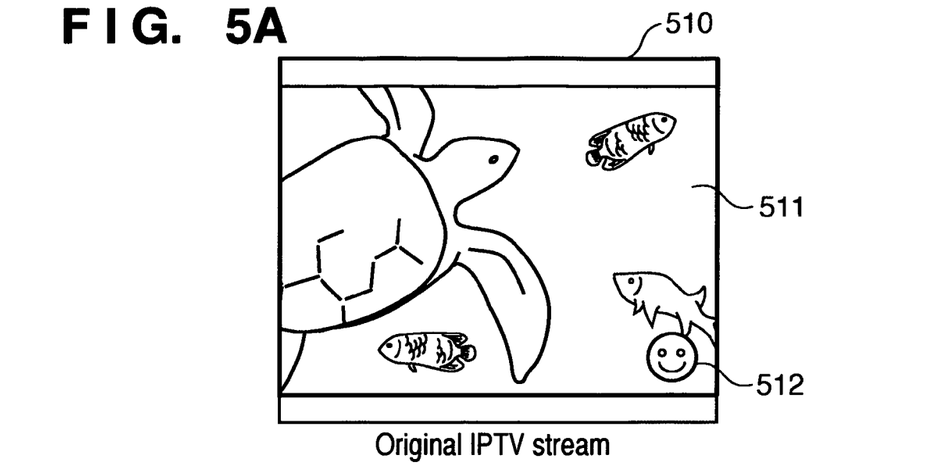
FIG. 5A shows an exemplary view of the IPTV terminal display, displaying TV content streamed in normal situation.
Figure 5B:
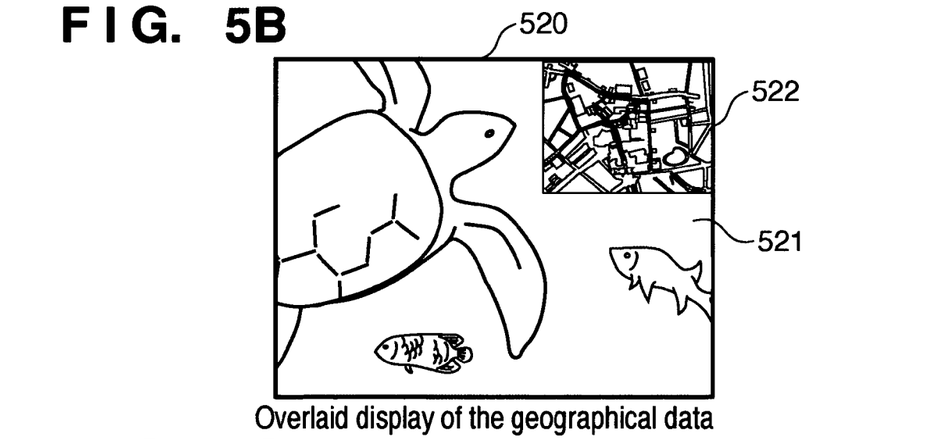
FIG. 5B shows an exemplary view of the IPTV terminal display, displaying an over laid modifiable route information over a IPTV stream.
Figure 5C:
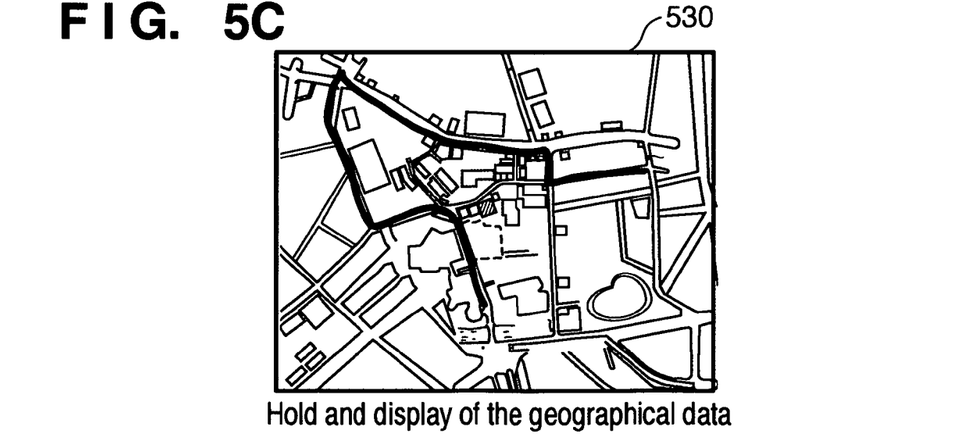
FIG. 5C shows an exemplary view of the IPTV terminal display, displaying a modifiable route information display by holding the IPTV stream.
Figure 6A:
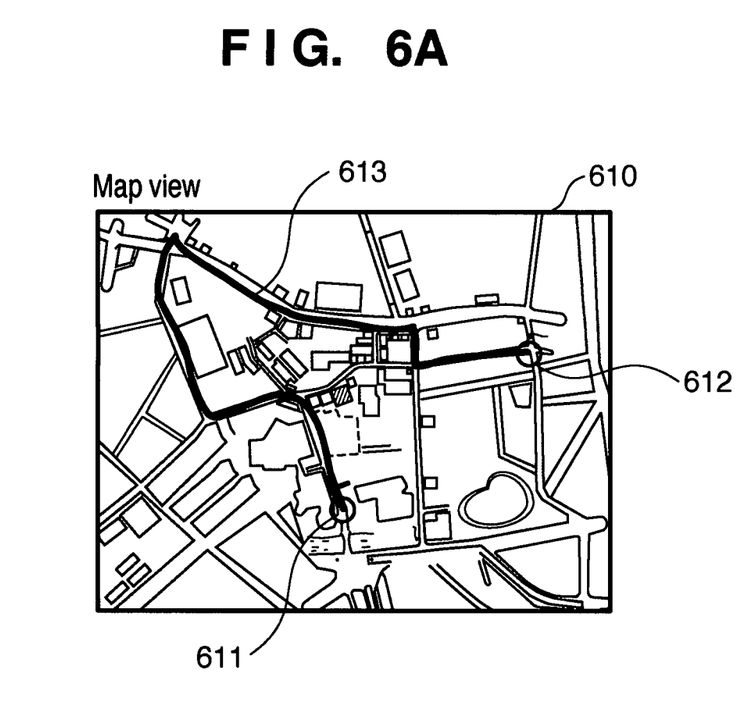
FIG. 6A shows an exemplary view of the IPTV terminal display, displaying a modifiable route information shown on a two-dimensional map view.
Figure 6B:
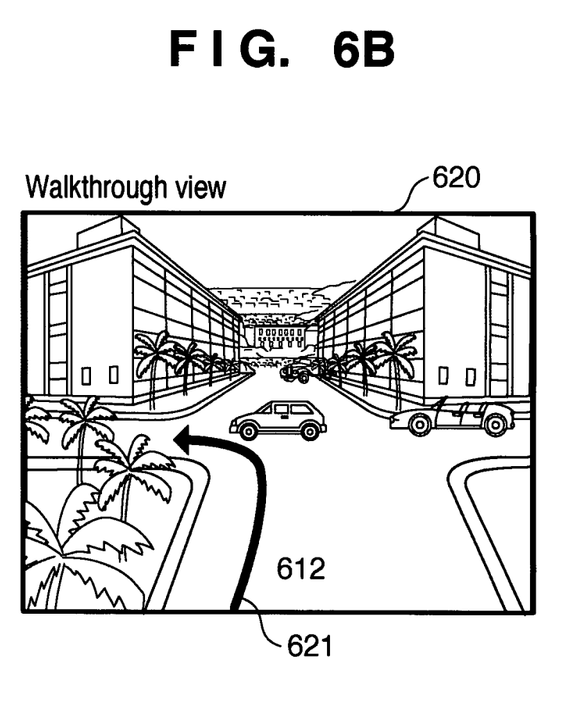
FIG. 6B shows an exemplary view of the IPTV terminal display, displaying a modifiable route information shown in a three-dimensional walkthrough view.

The Display Unit 121 processes the information to be shown on the display and then displays the information on a monitor. FIGS. 5A to 5C and FIGS. 6A and 6B show examples of the Display Unit 121 output on the monitor. The FIG. 5A shows a case where an IPTV stream is displayed on full screen 510 and a incoming route correction request is indicated by an icon 512; FIG. 5B shows a case where a two dimensional map data (geographical information) is overlaid on the IPTV stream; and FIG. 5C shows a case where a two dimensional map data (geographical information) is displayed on full screen by holding the IPTV stream. The FIG. 6A shows a case where modifiable map is shown on a two dimensional map view 610. In FIG. 6A, a route 613 from the current location 611 to the destination location 612 is displayed. FIG. 6B shows a case where modifiable map is shown in a walkthrough view 620. The route 621 shows a traveling direction towards the destination location.

The Operation Unit 122 accepts user operations conducted by the user using devices such as a remote controller, keyboard, touch-screen and etc. The Operation Unit 122 also generates corresponding visual feedback based on user operations through the Display Unit 121.

The Content Receiving Unit 123 receives streaming contents generated at the Content Server 140 through the Receiving Unit 124. The received contents are passed into the Display Unit 121 after conducting basic processing such as data flow control. Then, the Display Unit 121 displays the streaming data received from the Content Receiving Unit 123 accordingly.

Figure 1D:
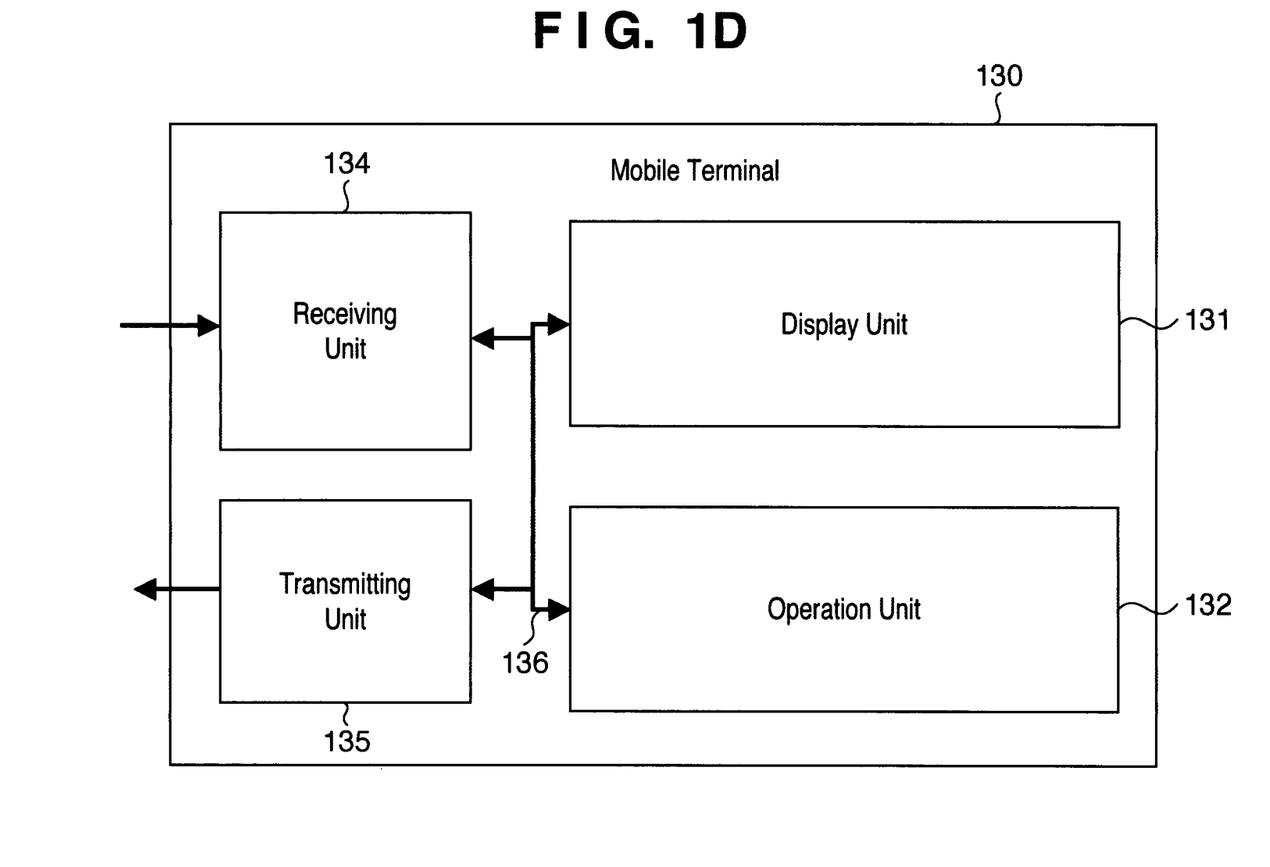
FIG. 1D shows an exemplary functional block diagram of the Mobile Terminal.

The Mobile Terminal 130 as shown in FIG. 1D includes a Display Unit 131, an Operation Unit 132, a Receiving Unit 134 and a Transmitting Unit 135 as main functional units.

The Receiving Unit 134 receives data and the Transmitting Unit 135 transmits the data according to the instructions provided by the central processing unit (CPU) of the Mobile Terminal 130. The Display Unit 131 displays information to be displayed to the mobile user; the Operation Unit 132 comprise of operating units such as buttons, touch screens and etc, and is used for receiving the user input. The Mobile Terminal 130 user may trigger a request for route modification using the Operation Unit 132.

The Content Server 140, as shown in FIG. 1A, generates IPTV contents sent to the IPTV terminal 120. The Content Server 140 has a bidirectional communication channel with the IPTV terminal 120 and it can hold the content stream and restart when needed according to the IPTV terminals' 120 request.

The Location Server 150, as shown in FIG. 1A, receives the current location of the Mobile Terminal 130 which obtains the current location by internal sensors such as GPS receivers installed into the Mobile Terminal 130. The Location Server 150 may utilize external sensing methods such as signal strength based location sensing methods and etc. The Location Server 150 records the current locations of a plurality of Mobile Terminals 130 in a location database. The Location Server 150 identifies each Mobile Terminal 130 by its Mobile Terminal ID and uses it to manage current location of each Mobile Terminal 130 in the location database. The Mobile Terminal ID may be an identifier such as MAC address, IMPI (IP Multimedia Private Identity), and etc. which allows identifying the terminal uniquely. The Location Server 150 is always able to know the current location of the Mobile Terminal 130 using an appropriate location sensing method. The Location Server 150 is implemented as a location server according to the IMS specifications.

Figure 3:
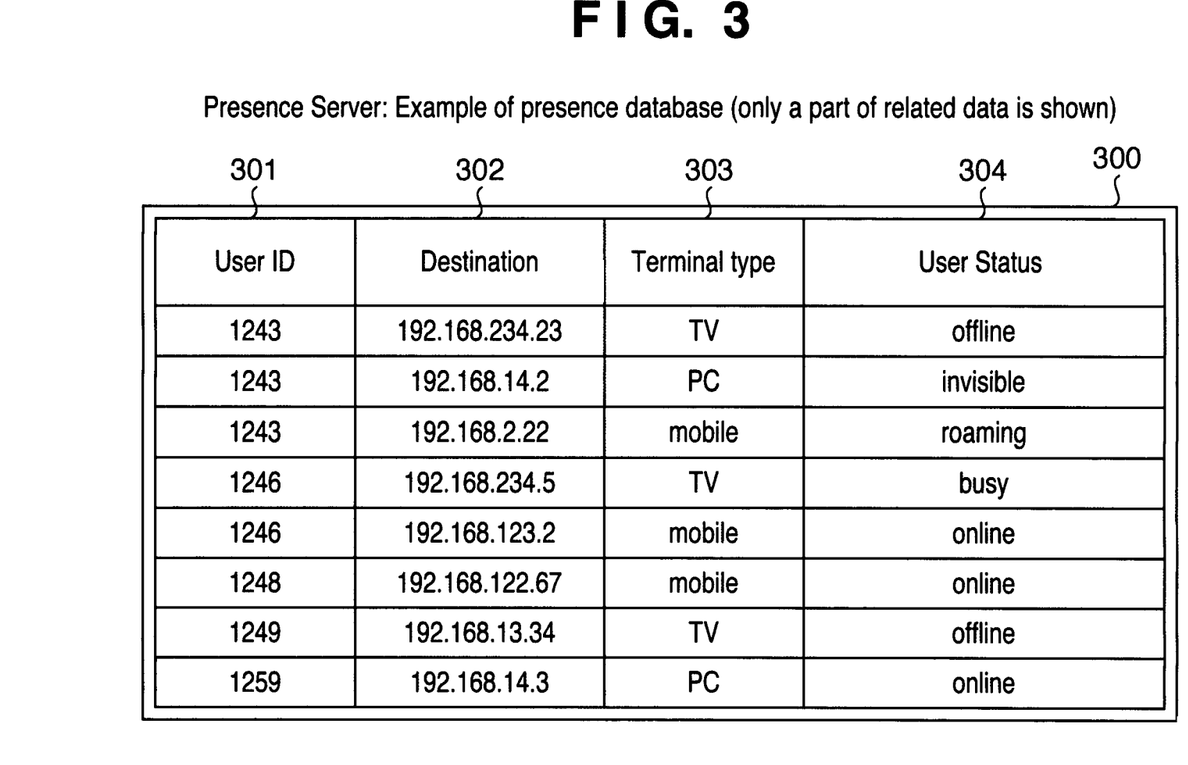
FIG. 3 shows an exemplary data table that represents part of the related data saved on Presence Server 160 according to the present invention.

The Presence Server 160 knows the presence of each user and sends the presence information of a user in response to a request from the Data Server 110. A part of an exemplary presence data table managed by the Presence Server 160 is shown in FIG. 3. Each row of the data table represents a value of the following tuple: <User ID 301, Destination 302, Terminal Type 303, User Status 304>. Here, the User ID 301 represents an identifier of the user to be used to uniquely identify the user. The Destination 302 contains a network address of a device allowed to be used by a user with the User ID 301. The Terminal Type 303 contains information about terminal functionality (TV, PC, etc.). The User Status 304 contains users' status at each terminal in that moment (online, offline, idle, etc.).

When the Data server 110 requests presence information of a user, the data server 110 can send a request of the presence information with the User ID to the Presence Server 160. The Presence Server 160 can provide presence information corresponding to the received User ID in a plurality of methods. As an example, the Presence Server 160 access all the tuple entries with the same User ID and among them selects the tuple with User Status 303 set to "online" and then, sends information of the selected tuple to the Data Server 110. The above discussed functionality of the Presence Server 160 is implemented according to the presence server specifications (http://www.3gpp.org/ftp/Specs/html-info/24141.htm) of an IMS system.

Figure 4:
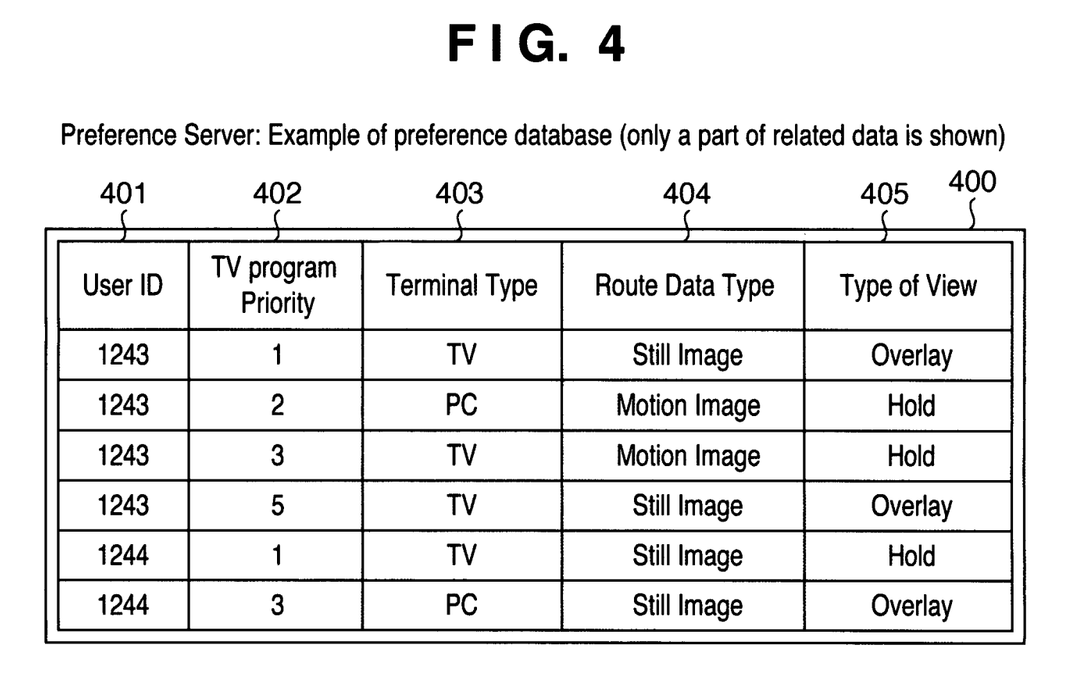
FIG. 4 shows an exemplary data table that represents part of the related data saved on Preference Server according to the present invention.

The Preference Server 170 contains general preference information, including route display preference of a plurality of present system users. The Preference Server 170 sends preference information of a user in response to a request from the Data Server 110. To explain the functionality of the Preference Server 170, part of an exemplary Preference data table managed by the Preference Server 170 is shown in FIG. 4. Each row of the data table represents a value of the following tuple: <User ID 401, TV Program Priority 402, Terminal Type 403, Route Data Type 404, Type of View 405>. The user ID 401 represents the identifier of a user. The TV Program Priority 402 represents the priority level of each TV program set according to initial information provided by the user. The Terminal Type 403 represents functionality of each terminal (TV, PC etc.). The Route Data Type 404 represents preferred data presentation of the route (still image or motion image). The Type of View 405 indicates the preferred displaying method of geographical information on a monitor.

When the Data server 110 requests preference information of a user, the Data server 110 can send a request of the preference information with the User ID to the Preference Server 170. The Preference Server 170 can provide-preference information corresponding to the received User ID in a plurality of methods. As an example, if the Data Server 110 only has the user ID then all the preference values corresponding to the provided User ID 401, the values of the TV Program Priority 402, the Terminal Type 403, the Route Data Type 404 and the Type of View 405 in the table 400, may be sent to the Data Server 110. On the other hand if the Data Server 110 has the corresponding value of the TV Program Priority 402 and the corresponding value of the Terminal Type 403 as well as the user ID 401, then the Preference Server 170 is able to send exact user preferred Route Data Type 304 value and the Type of View 305 value. The preference information request from the Data Server 110 includes at least users ID 401 with the request, and the corresponding reply is formed according to available information for each user as denoted in the above examples. The above functionality of the Preference Server 170 is implemented in a XDMS (the profile management system) server in an IMS system (http://member.openmobilealliance.org/ftp/Public_docume nts/PAG/Permanent_documents/OMA-AD-XDM-V2_1-20081022-D.zip).

Above, the characteristics of each element of the present embodiment is explained. Hereupon, the procedure and signal flow of the system when a user requests for a route modification is discussed. The discussion is conducted in correspondent to sequence diagram of FIG. 2. An exemplary case is considered were a Mobile Terminal 130 user (mobile user) requests a route modification from an assigned user (IPTV user), who is watching an IPTV stream on an IPTV Terminal 120. In this case, the users have registered with the Presence Server 160 and system knows their presence in each terminal according to the IMS standards. Moreover, the initial authentication and the signaling are conducted according to IMS standards.

Figure 2:
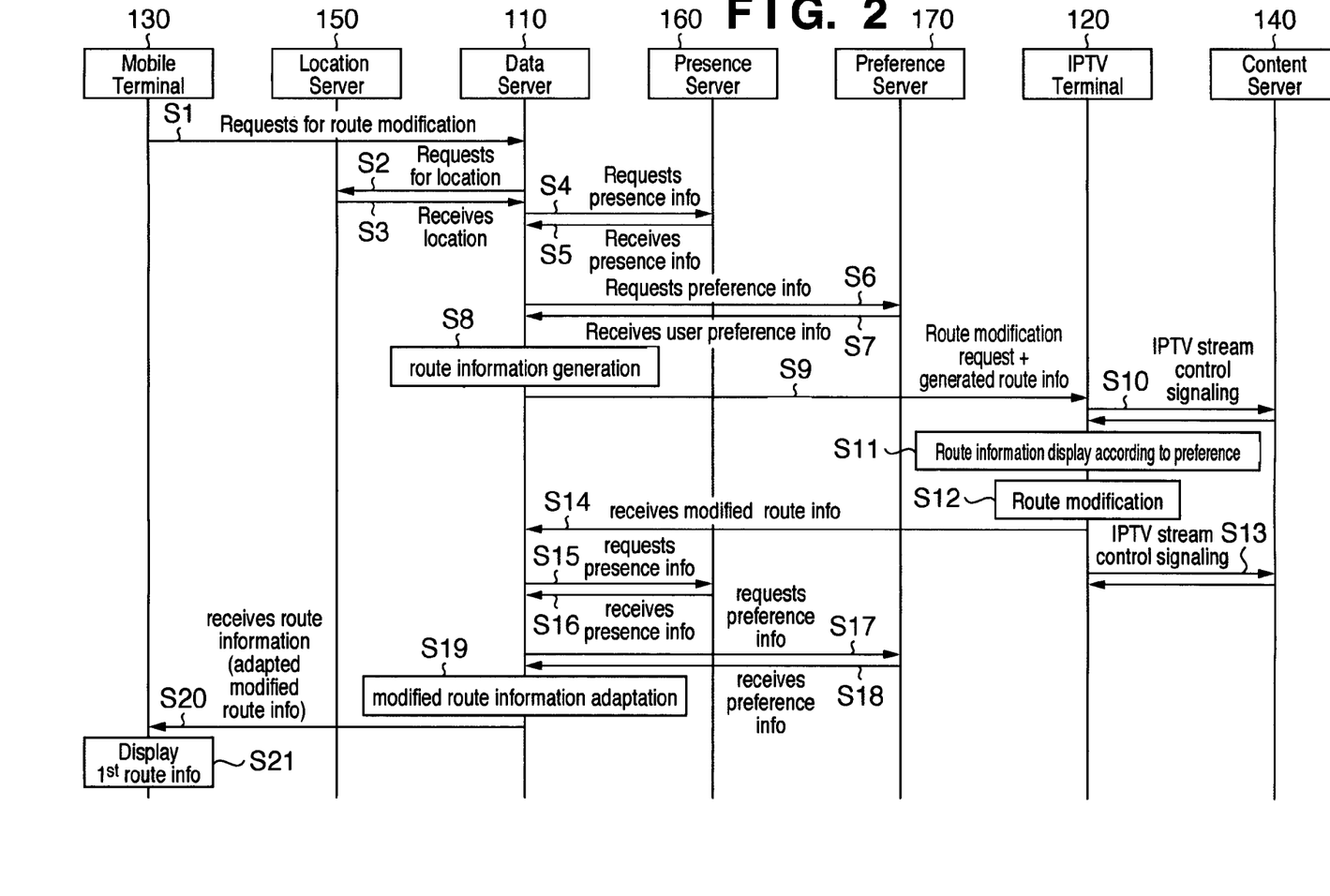
FIG. 2 shows an exemplary sequence diagram representing the flow of processes and signaling when an assigned IPTV terminal user provides route information modification to a Mobile Terminal user in reply to the request made by the Mobile Terminal user according to an exemplary embodiment of the present invention.

In step S1, The Mobile Terminal 130 sends a request for route modification to the Data Server 110. This request includes the user ID of the designated user (IPTV users' ID in this case) and the destination location.

In step S2, the Data Server 110 requests current location of the Mobile Terminal 130 from the Location Server 150. This request includes the Mobile Terminal ID. The Mobile Terminal ID is an identifier that allows uniquely identifying the Mobile Terminal 130, for example IMPI (IMS Private User Identity), which may be used by the Location Server 150 to manage the location database.

In step S3, the Data Server 110 receives current location data of the Mobile Terminal 130 from the Location Server 150. The current location data includes present location coordinates of the Mobile Terminal 130. However, in case the current location data of the Mobile Terminal 130 is included in the route modification request received in step S1, the steps S2 and S3 may be skipped.

In step S4, the Data Server 110 requests the presence information of the user from the Presence Server 160. The request includes at least a user ID of the designated user.

In step S5, the Data Server 110 receives the presence information of the user from the Presence Server 160. The presence information includes a network address indicating Destination 402 and a value indicating Terminal Type 403 regarding the current terminal in use by the designated user. Based on the destination information included in the presence information, the Data Server 110 obtains the network address of the IPTV terminal 120 (the current terminal in use by the designated user).

In step S6, the Data Server 110 requests preference information of the designated user from the Preference Server 170. The request at least includes a user ID of the designated user.

In step S7, the Data Server 110 receives the preference information of the designated user from the Presence Server 160. The preference information includes display preference and route data type preference. As shown in FIG. 4, the Preference Server 170 includes information on the TV Program Priority 402, the Terminal Type 403, the Route Data Type 404 and the Type of View 405. As an example, considering User ID=1244 is the designated user, in case TV Program Priority is "1" and the terminal in use is a "TV", the Route Data Type 404 preference is "still image" and Type of View 405 preference is "hold" according to the data table 400. On the other hand, in case TV Program Priority is "3" and the terminal in use is a "PC", the Route Data Type 404 preference is "still image" and the Type of View 405 preference is "overlay" according to the data table 400. Based on this response, the Data Server 110 selects a suitable method to present the route data on the display depending on users' preferences.

In step S8, the Data Server 110 generates the route information and adapts the information according to the IPTV terminal 120 preference obtained from the Preference Server 170 in step S7. In case the mobile user did not include the destination location in his route modification request, the Data server 110 set designated users' location as the destination. The location address of the designated user may be obtained from the Presence Server 160. The Presence Server 160 can manage the geographical location address of each device registered in the table 300. The route modification request created for sending from Data Server 110 to IPTV Terminal 120 contains at least the current location, the destination location, surrounding geographical data according to designated users' preference. The route modification request may include description control IPTV stream according to the received display preference (a value in Type of View 405 of FIG. 5).

In step S9, Data Server 110 sends the created route modification request to the IPTV terminal 120 using the Destination 302 of the IPTV terminal 120 obtained in step S5.

In step S10, the IPTV terminal 120 conducts control signaling with the Content Server 140 and controls IPTV stream according to the received display preference (a value in Type of View 405 column of FIG. 5).

In step S11, in case the type of view 405 received from the Data Server 110 is "overlay", the IPTV Terminal 120 continues displaying the IPTV stream, while overlaying the route information on the IPTV stream as shown in FIG. 5B. In case the showing preference is "hold" the IPTV stream is held and route information is shown in the display as shown in FIG. 5C.

In step S12, the assigned user modifies the route using the Operation Unit 122. The IPTV terminal 120 accepts the modifications conducted by the assigned user. In case of the two-dimensional map view, first the modification conducted to the route 613 by the assigned user is accepted by the Operation Unit 122, and then based on the accepted modified route information the points which represents the route is updated. In case of the three-dimensional walkthrough view, first the modification conducted to route 621 by assigned user by changing the advancing direction and/or turning points is accepted and recoded by the Operation Unit 122, and then based on the accepted modified route information the points which represents the route is updated.

In step S13, after the route modification of step S12 is concluded, the IPTV stream is controlled accordingly to restore the previous IPTV stream, by conducting signaling between the IPTV terminal 120 and the Content Server 140.

In step S14, IPTV terminal 120 sends the modified route information to the Data Server 110. The modified route information contains at last the current location of the mobile user, the destination location and set of location coordinates that defines the modified route from current location to the destination location.

In step S15, similarly to the step S4, the Data Server 110 request for presence information of the mobile user from the Presence Server 160. The presence information such as busy, invisible and etc. that obtained in this step can be utilized for defining preference rules. As an example when user is busy selecting one set of preferences or changing the usual preference settings can be given. However, in case such rule based preference selection is not conducted S15 may be skipped.

In step S16, similarly to the step S5, the Data Server 110 receives presence information of the mobile user from the Presence Server 160.

In step S17, similarly to the step S6, the Data Server 110 request for preference information of the mobile user from the Preference Server 170.

In step S18, similarly to the step S7, the Data Server 110 receives preference information of the mobile user from the Preference Server 170.

In step S19, similarly to the step S8, the Data Server generates modified route information based on modified route information received from the IPTV terminal 120 and adapts the information to Mobile Terminal 130 according to mobile users preferences.

In step S20, The modified route information adapted to the Mobile Terminal 130 is sent to the Mobile Terminal 130 from the Data Server 110.

In step S21, The Mobile Terminal 130 displays the modified route information.

In another embodiment according to the present invention, the mobile user may choose to navigate from an arbitrary location other than the current location of the Mobile Terminal 130 as a start point of the navigation. The mobile user may specify that location as the navigation starting point on the map displayed on the display unit 131 of the Mobile Terminal 130 using the operation unit 132. The mobile user may include the specified location in the route modification request of S1 in FIG. 2. In this case, the specified location is used instead of the current location of the Mobile Terminal 130 in following steps, and allows obtaining the modified route information from the specified location to the destination. The Location Extraction Unit 111 extracts the specified location from the message received from the Mobile Terminal 130. If necessary, the Location Extraction Unit 111 may obtain a location coordinates corresponding to the specified location from the Location Server 150.

While the present invention has been described with reference to the exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A data server providing modified route information to a first user terminal used by a first user, the data server comprising:
   a receiving unit configured to receive a request from the first user terminal for requesting that a second user terminal used by a second user modify route information generated by the data server;
   a geographical database configured to store geographical data;
   a route information generation unit configured to generate route information that indicates a route from a first location to a second location, using the geographical data; and
   a transmitting unit configured to transmit a route modification request together with the generated route information to the second user terminal, the route modification request requesting the second user terminal to modify the generated route information,
   wherein said receiving unit is further configured to receive modified route information from the second user terminal, and
   wherein said transmitting unit is further configured to transmit the modified route information to the first user terminal.

2. The data server according to claim 1, wherein said route information generating unit is further configured to adapt the modified route information to preferences of the first user before transmitting the modified route information to the first user terminal.

3. The data server according to claim 1, wherein said route information generating unit is further configured to determine the second location as a location of the second user terminal in case the second location is not included in the request from the first user terminal.

4. The data server according to claim 1,
   wherein said receiving unit is further configured to receive from a preference server a first user preference relating to a display mode of the route information on the first user terminal, and
   wherein said route information generating unit is configured to generate the route information further using the first user preference.

5. The data server according to claim 1,
   wherein said receiving unit is further configured to receive a second user preference relating to a display mode of the route information on the second user terminal, and
   wherein said route information generating unit is configured to generate the second route information further using the second user preference.

6. The data server according to claim 1,
   wherein said receiving unit is further configured to receive a user preference that includes a plurality of preferences regarding display modes of route information on either the first or second user terminal, a detail level of the map on which the route is displayed, and data type; and
   wherein said route information generating unit is configured to generate the route information further using the user preference.

7. The data server according to claim 6, wherein the display modes include a two dimensional display mode based on a map type of view and a three dimensional display mode based on a walkthrough type of view, the detail level of the map includes the number of entities displayed on the route, and the data type includes still image and motion image.

8. The data server according to claim 1,
   wherein the route information generating unit is configured to generate route information that includes a first geographical coordinate of the first location, a second geographical coordinate of the second location, and a set of third geographical coordinates that represent the route from the first location to the second location, and
   wherein, in the modified route information, at least one of the second geographical coordinate and the set of third geographical coordinates is modified.

9. The data server according to claim 1, wherein the first location is a current location of the first user terminal or a location specified by the first user other than the current location, and the second location is a destination location of the first user.

10. A user terminal configured to communicate with a data server and to receive a route modification request for modifying route information for a user of a first user terminal, the user terminal comprising:
    a receiving unit configured to receive the route modification request from the data server, the route modification request received together with the route information, said route information indicating a route from a first location to a second location;
a display unit configured to display the route information;
a user operation unit configured to accept user operations for modifying the route information responsive to the received route modification request; and
a transmitting unit configured to transmit the modified route information to the data server.

11. The user terminal according to claim 10, wherein the first location is a current location of the first user terminal or a location specified by the user other than the current location, and the second location is a destination location of the user.

12. The user terminal according to claim 10, further comprising a content receiving unit configured to receive content to be displayed on said display unit from a content server, and wherein, if the user terminal receives the route modification request when the content is displayed on said display unit, said display unit is configured to hold the displayed content to display the route information, according to a user preference relating to the displayed content.

13. The user terminal according to claim 10, further comprising a content receiving unit configured to receive content from a content server to be displayed on said display unit, and wherein, if the user terminal receives the route modification request when the content is displayed on said display unit, said display unit is configured to overlay the route information on the display unit without holding the displayed content, according to a user preference relating to the displayed content.

14. The user terminal according to claim 10,
wherein the route information includes a first geographical coordinate of the first location, a second geographical coordinate of the second location, and a set of third geographical coordinates that represent a route from the first location to the second location, and
wherein, in the modified route information, at least any one of the second geographical coordinate and the set of the third geographical coordinates is modified.

15. A route information providing system comprising a first user terminal used by a first user, a second user terminal used by a second user, and a data server providing the first user terminal with first route information,
wherein said data server comprises:
a receiving unit configured to receive a request from the first user terminal for requesting that the second user terminal modify second route information generated by the data server;
a geographical database configured to store geographical data;
a route information generation unit configured to generate the second route information using the geographical data, the second route information indicating a route from a first location to a second location; and
a transmitting unit configured to transmit a route modification request together with the second route information to the second user terminal, the route modification request requesting the second user terminal to modify the second route information,
wherein said receiving unit is further configured to receive modified second route information from the second user terminal,
wherein said route information generation unit is further configured to generate the first route information using the modified second route information, and wherein said transmitting unit is further configured to transmit the first route information to the first user terminal,
wherein said first user terminal comprises:
a transmitting unit configured to transmit said request to said data server;
a receiving unit configured to receive the first route information from the data server; and
a display unit configured to display the received first route information, and
wherein said second user terminal comprises:
a receiving unit configured to receive said route modification request along with the second route information from the data server;
a display unit configured to display the second route information;
an operation unit configured to accept user operations for modifying the second route information responsive to the received route modification request; and
a transmitting unit configured to transmit the modified second route information to the data server.

16. A method for controlling a data server providing first route information to a first user terminal used by a first user, said method comprising:
receiving a request from the first user terminal for requesting that a second user terminal used by a second user modify second route information generated by the data server;
generating the second route information using geographical data stored in a geographical database, said second route information indicating a route from a first location to a second location;
transmitting a route modification request together with the second route information to the second user terminal, the route modification request requesting the second user terminal to modify the second route information;
receiving modified second route information from the second user terminal;
generating the first route information using the modified second route information; and
transmitting the first route information to the first user terminal.

17. A method for controlling a user terminal configured to communicate with a data server and to receive a route modification request for modifying route information for a user of a first user terminal, said method comprising:
receiving the route modification request together with the route information from the data server, said route information indicating a route from a first location to a second location;
displaying the route information on a display unit;
accepting user operations for modifying the route information responsive to the route modification request; and
transmitting the modified route information to the data server.

18. A method for controlling a route information providing system comprising a first user terminal used by a first user, a second user terminal used by a second user, and a data server providing the first user terminal with first route information, said method comprising:
transmitting from said first user terminal to said data server a request for requesting that the second user terminal modify second route information generated by the data server;
receiving the request at said data server;
generating at the data server the second route information using geographical data stored in a geographical database, said second route information indicating a route from a first location to a second location;

transmitting from the data server to said second user terminal a route modification request together with the second route information, the route modification request requesting the second user terminal to modify the second route information;

receiving the route modification request together with the second route information at said second user terminal;

displaying the second route information on a display unit of said second user terminal;

accepting user operations at said second user terminal for modifying the second route information responsive to the route modification request;

transmitting the modified second route information from said second user terminal to the data server;

receiving modified second route information at said data server;

generating the first route information at said data server, using the modified second route information;

transmitting the first route information from said data server to the first user terminal;

receiving the first route information at said first user terminal; and displaying the received first route information on a display unit of said first user terminal.

* * * * *

UNITED STATES PATENT AND TRADEMARK OFFICE
CERTIFICATE OF CORRECTION

| | | |
|---|---|---|
| PATENT NO. | : 8,655,581 B2 | Page 1 of 1 |
| APPLICATION NO. | : 13/061886 | |
| DATED | : February 18, 2014 | |
| INVENTOR(S) | : Hjelm et al. | |

It is certified that error appears in the above-identified patent and that said Letters Patent is hereby corrected as shown below:

In the Specification

In Column 4, Line 9, delete "Multiple. Access" and insert -- Multiple Access --, therefor.

In Column 6, Lines 61-62, delete "provide-preference" and insert -- provide preference --, therefor.

Signed and Sealed this
Fifteenth Day of July, 2014

Michelle K. Lee
*Deputy Director of the United States Patent and Trademark Office*